(12) United States Patent
Lee et al.

(10) Patent No.: US 6,710,498 B1
(45) Date of Patent: Mar. 23, 2004

(54) POLYMER COMPOSITE SQUIRREL CAGE ROTOR WITH HIGH MAGNETIC PERMEABILITY FILLER FOR INDUCTION MOTOR AND METHOD OF MAKING IT

(75) Inventors: Dai Gil Lee, Taejon (KR); Seung Hwan Chang, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/710,665

(22) Filed: Nov. 9, 2000

(30) Foreign Application Priority Data

Nov. 10, 1999 (KR) .......................................... 1999-49704
Jan. 31, 2000 (KR) ........................................... 2000-4587

(51) Int. Cl.⁷ ............................ H02K 1/32; H02K 17/16
(52) U.S. Cl. ............................ 310/211; 310/44; 310/54; 310/61; 310/261
(58) Field of Search ................................ 310/261, 211, 310/52–63, 60 A, 64–65, 44

(56) References Cited

U.S. PATENT DOCUMENTS

| 3,246,188 | A | * | 4/1966 | McGarvey et al. | ......... 310/183 |
| 3,715,610 | A | * | 2/1973 | Brinkman | ..................... 310/54 |
| 3,891,879 | A | * | 6/1975 | Yamada et al. | ............. 310/261 |
| 4,508,567 | A | | 4/1985 | Mizuno et al. | ................ 75/231 |
| 4,674,178 | A | | 6/1987 | Patel | ........................... 29/598 |
| 5,122,704 | A | * | 6/1992 | Blakeley et al. | ............ 310/262 |
| 5,211,896 | A | * | 5/1993 | Ward et al. | ................. 264/126 |
| 5,285,699 | A | | 2/1994 | Walls et al. | .................. 74/572 |
| 5,382,219 | A | | 1/1995 | Malekmadani | ............... 494/16 |
| 5,546,648 | A | | 8/1996 | Tarrant | ........................ 29/598 |
| 5,990,588 | A | * | 11/1999 | Kliman et al. | ................ 310/86 |

FOREIGN PATENT DOCUMENTS

SU          1385187 A   *   3/1988

* cited by examiner

Primary Examiner—Burton Mullins
(74) Attorney, Agent, or Firm—Jaeckle Fleischmann & Mugel, LLP (57) ABSTRACT

Disclosed herein is, a composite squirrel cage rotor having a polymer resin part containing powder of high magnetic permeability and method for fabricating it. The composite squirrel cage rotor includes a rotating shaft, an inner core, a polymer resin part that fills the cavity of the squirrel cage conductor and contains powder of high magnetic permeability. A squirrel cage conductor is positioned outer to portion of the polymer resin part, is formed of, material having high electric conductivity, and provided with a plurality of axial slots.

3 Claims, 8 Drawing Sheets

POLYMER COMPOSITE SQUIRREL CAGE ROTOR WITH HIGH MAGNETIC PERMEABILITY FILLER FOR INDUCTION MOTOR AND METHOD OF MAKING IT

CROSS-REFERENCE TO RELATED APPLICATIONS

This application claims priority of Korean Patent Application 1999-49704, filed Nov. 10, 1999 and Korean Patent Application 2000-04587, filed Jan. 31, 2000.

BACKGROUND OF THE INVENTION

1. Field of the Invention

The present invention relates generally to a squirrel cage rotor for induction motors, and more particularly to a squirrel cage rotor that has a polymer resin part containing powder of high magnetic permeability.

In addition, the present invention relates to a method of fabricating the squirrel cage rotor using jig so as to prevent the conductor bars from being buckled.

2. Description of the Prior Art

In a rotating body such as a rotor of a motor, a centrifugal force is generated in proportion to the mass of the rotor and the square of the rotational speed of the rotor, so that the rotor with high rotating speed may have, excessive deformation due to a large stress by the centrifugal force.

The quality of machined products mainly depend on the precision of machine tool which is equipped with built-in type spindle system that is composed of the rotor of motor and the spindle shaft, but the heavy mass of rotor can deteriorate dynamic stability of the built-in type spindle system because the heavy mass of rotor may cause excessive stress and deformation. Therefore, it is important to reduce the inertial force of the rotor by reducing mass of rotor.

The rotating speed of a built-in type spindle generally is restricted by a DN value (where D is a bearing nominal diameter in mm and N is the revolutions per minute of the spindle) and the critical whirling vibration frequency of the spindle. In particular, in the case of a built-in type spindle which is composed of the spindle shaft and the rotor of motor, the bending natural frequency is largely influenced by the mass of the rotor of a motor. Accordingly, as the mass of the rotor of a motor is increased, the bending natural frequency of a built-in type spindle is decreased, thus the heavy mass of rotor limits the maximum rotating speed of the built-in type spindle.

Accordingly, for a built-in type spindle rotating at high speed, it is necessary to increase the specific bending stiffness of the built-in type spindle shaft or decrease the mass of the rotor of a motor.

Figure 1:
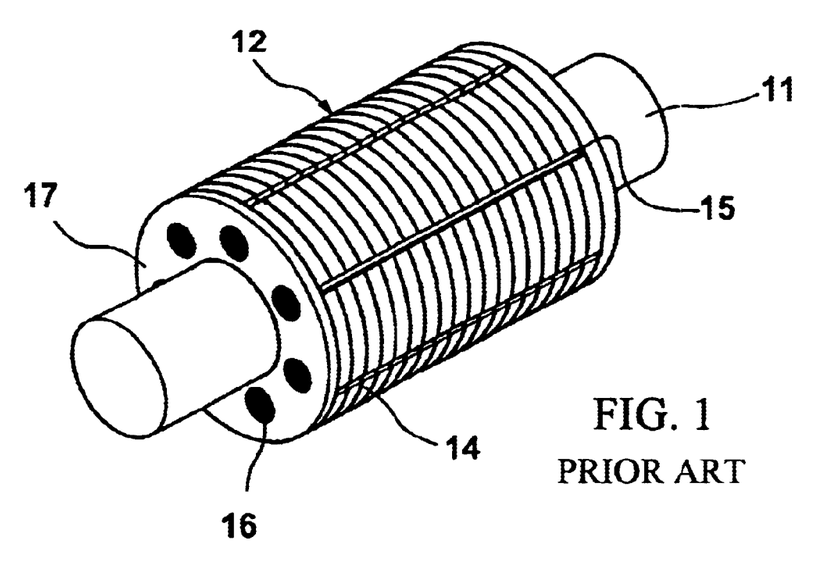
FIG. 1 is a perspective view of a conventional squirrel cage rotor.
Figure 2:
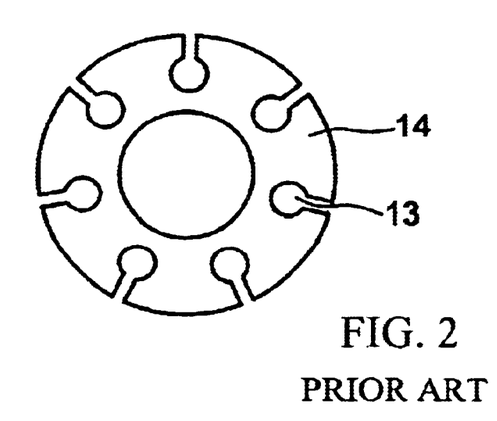
FIG. 2 is a front view of a silicon steel sheet of the squirrel cage rotor.

A conventional squirrel cage rotor is illustrated, in FIGS. 1 and 2.

As depicted in FIGS. 1 and 2, this conventional squirrel cage rotor includes a rotating shaft 11. A silicon steel rotor 12 is fitted around the rotating shaft 17. The silicon steel rotor 12 is fabricated by stacking a plurality of silicon steel sheets 14. Plurality of conductor bars 16 are respectively inserted into the holes 13 and then the two end rings 17 are fabricated by die-casting. Therefore, the conductor bars 16 are short-circuited by two end rings 17 that are positioned at both ends of the silicon steel rotor 12.

Since this conventional squirrel cage rotor has heavy mass due to the high density of silicon steel not only a large centrifugal force is generated inside of rotor body, but also is high torque is required to drive the motor.

In order to solve above problems, Korean Pat. Appln. No. 98-50187 discloses "Composite squirrel cage rotor with magnetic powders and method for fabricating it".

Figure 3A:
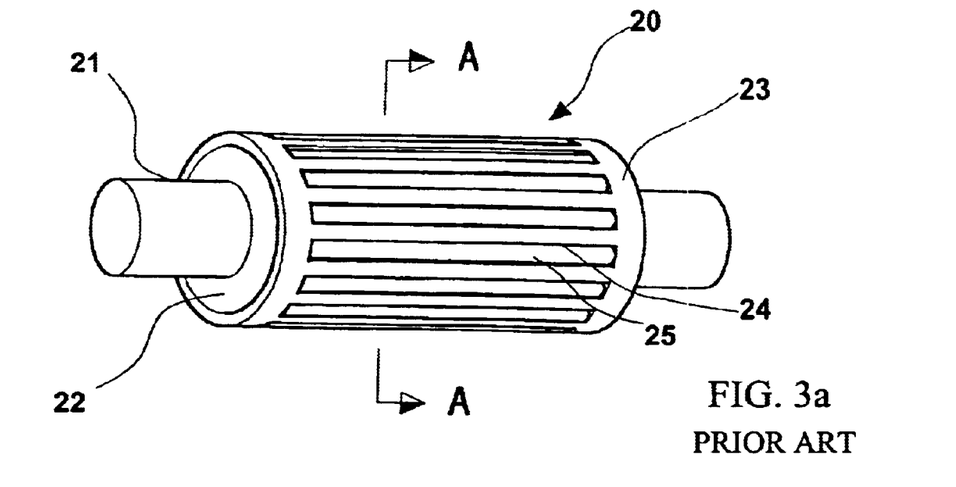
FIG. 3a is a perspective view of another conventional composite squirrel cage type rotor.
Figure 3B:
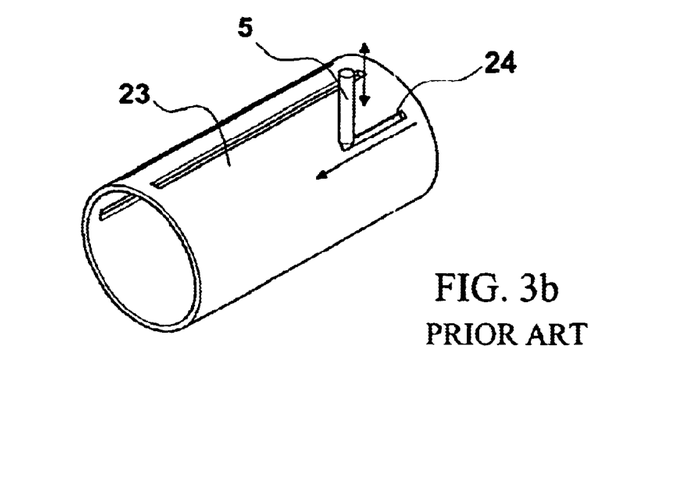
FIG. 3b is a perspective view showing the machining of a squirrel cage conductor of the composite squirrel cage rotor.
Figure 4:
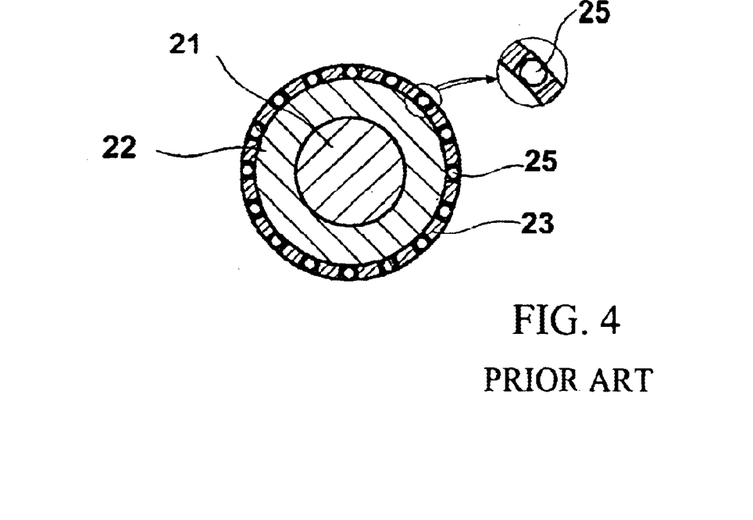

With reference to FIGS. 3a and 4, the invention of this patent is described in detail.

As shown in FIGS. 3a and 4, a composite squirrel cage rotor 20 is composed of a composite pipe 22, a rotating shaft 21 and a squirrel cage conductor 23 which is positioned around the pipe 22 and provided with a plurality of slots 24. A plurality of heat pipes 25 may be inserted into the slots 24, respectively.

In this case, the pipe 22 is, fabricated by stacking and curing of composite prepregs which is composed of polymer resin and high strength and modulus fibers. In this case, the pipe 22 is made of fiber reinforced composite material whose polymer resin contains powder of high magnetic permeability such as iron powder in order to improve the performance of the motor.

As depicted in FIG. 3a, this squirrel cage conductor 23 is made of copper or aluminum having high electric conductivity. Plurality of slots 24 are machined along the axis of the squirrel cage conductor 23 by using an end mill or an electric discharge machine tool or a laser machine tool. Each of the slots 24 is formed to be straight along the axis or have a certain angle with the axis. The slots 24 are spaced apart from one another by predetermined regular intervals. In this case, conductor bars and two end rings are integrated into a single squirrel cage conductor 23.

Figure 5:
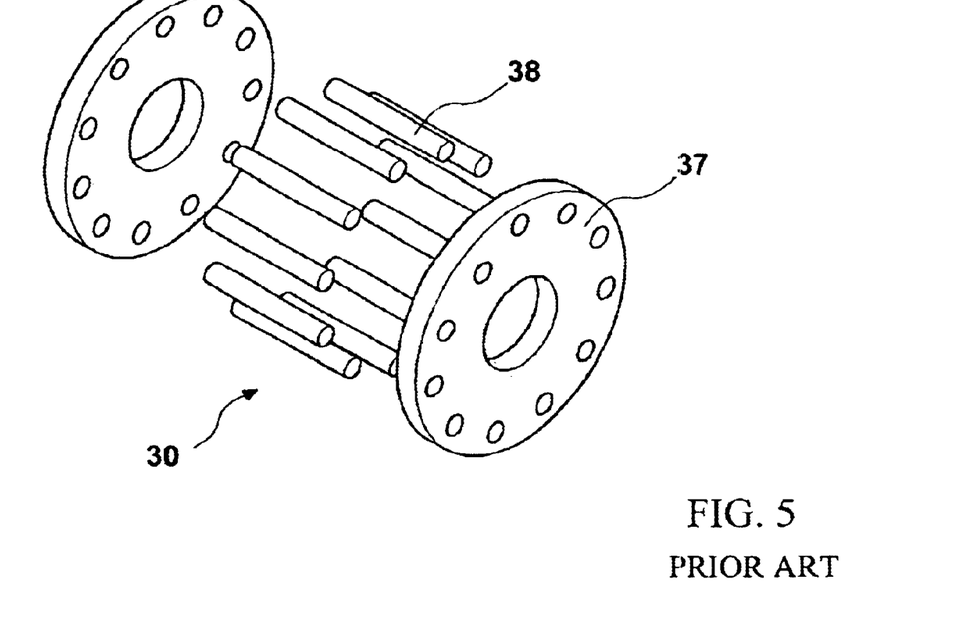
FIG. 5 is a perspective view showing the assembly of the conductor bars and end rings of a squirrel cage conductor.
Figure 6:
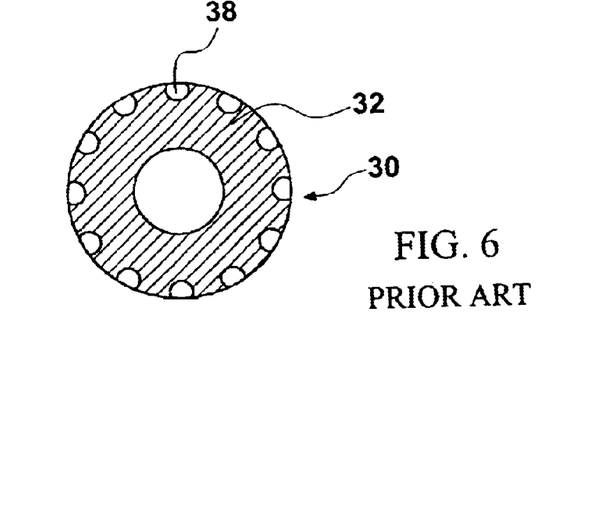
FIG. 6 is a cross section showing the finished composite squirrel cage rotor of FIG. 5.

However, this squirrel cage conductor 23 has a problem of high machining cost. In order to solve this problem, another composite squirrel cage rotor 30 is proposed as shown in FIGS. 5 and 6. This composite squirrel cage rotor 30 includes, two end rings 37. A plurality of holes are formed in each of the end rings 37 and the both ends of the same number of conductor bars 38 are inserted into holes of two end rings 37 by interference fit, with appropriate axial load.

The conductor bars 38 are made of copper or aluminum because copper and aluminum, have high electric conductivity. But since copper or aluminum has low stiffness, the conductor bars 38 which have small diameter relative to the axial length are easily buckled by an excessive axial load during the assembly of the squirrel cage conductor.

After the polymer resin part is cured, the squirrel cage conductor combined with the polymer resin part is ground in order to expose the small portion of the conductor bars 38 on its outer surface. If the conductor bars 38 have been buckled, the exposed areas of the conductor bars 38 are not uniform along the axis of the squirrel cage rotor. This may to cause the performance deterioration of the composite squirrel cage rotor.

SUMMARY OF THE INVENTION

Accordingly, the present invention has been considered the above problems occurring in the prior art, and an object of the present invention is to provide a squirrel cage rotor, which has a polymer resin part containing powder of high, magnetic permeability so that the rotor has low mass.

Another object of the present invention is to provide a squirrel cage rotor having a polymer resin part containing powder of high magnetic permeability, which is provided with a plurality of heat pipes to dissipate heat generated by induction operation between the stator and the rotor of motor.

A further object of the present invention is to provide a method for fabricating a squirrel cage conductor, which prevents conductor bars from being buckled.

In order to accomplish the above objects, the; present invention provides a squirrel cage rotor, comprising: a rotating shaft; a polymer resin part containing powder of high magnetic permeability; and a squirrel cage conductor made of material having high electric conductivity and positioned around the outer portion of the polymer resin part; wherein the powder of high magnetic permeability has a role of increasing the flux density of rotor and is uniformly distributed in the polymer resin part.

In accordance with a feature of the present invention, the slots of the squirrel cage conductor are provided with a plurality of heat pipes, respectively.

In accordance with a feature of the present invention, the rotor further comprises an inner core of high magnetic permeability so as to guide the magnetic flux from the stator to the rotor of motor.

In accordance with a feature of the present invention, chopped fibers are added to the polymer resin part so as to improve mechanical properties such as thermal stability and stiffness.

In addition, the present invention provides a method for fabricating a squirrel cage rotor, the rotor having a rotating shaft, a plurality of conductor bars, two end rings and a polymer resin part containing powder of high magnetic permeability, comprising the steps of: surrounding each of the conductor bars by a pair of jig; inserting the ends of the conductor bars into the holes of the end rings; removing the jig from each conductor bar; curing the polymer resin part containing powder of high magnetic permeability after inserting the squirrel cage conductor composed of the conductor bars and the end rings into the mold; and grinding of the outer surface of the composite squirrel cage rotor to composed of the conductor bars, the end rings and the polymer, resin part.

In accordance with a feature of the present invention, the jig is fabricated by axially dividing a cylinder into two equal parts, each of the conductor bars is surrounded by the jig, and the jig is shorter than each of the conductor bars in axial length.

In accordance with a feature of the present invention, the method further comprises the steps of fastening band clamp around the jigs surrounding the conductor bars, and removing the band clamp and the jigs from the conductor bars after the assembly of the conductor bars and the end rings.

BRIEF DESCRIPTION OF THE DRAWINGS

The above and other objects, features, and other, advantages of the present invention will be more clearly understood from the following detailed description taken in conjunction with the accompanying drawings, in which:

FIG. 4 is a cross section taken along line A—A of FIG. 3a;

DESCRIPTION OF THE PREFERRED EMBODIMENTS

Reference now should be made to the drawings, in which the same reference numerals are used throughout the different to drawings to designate the same or similar components.

Hereafter, with reference to accompanying drawings, there is described a squirrel cage rotor having an inner core and a polymer resin part containing powder of high magnetic permeability in accordance with a preferred embodiment of the present invention.

Figure 7:
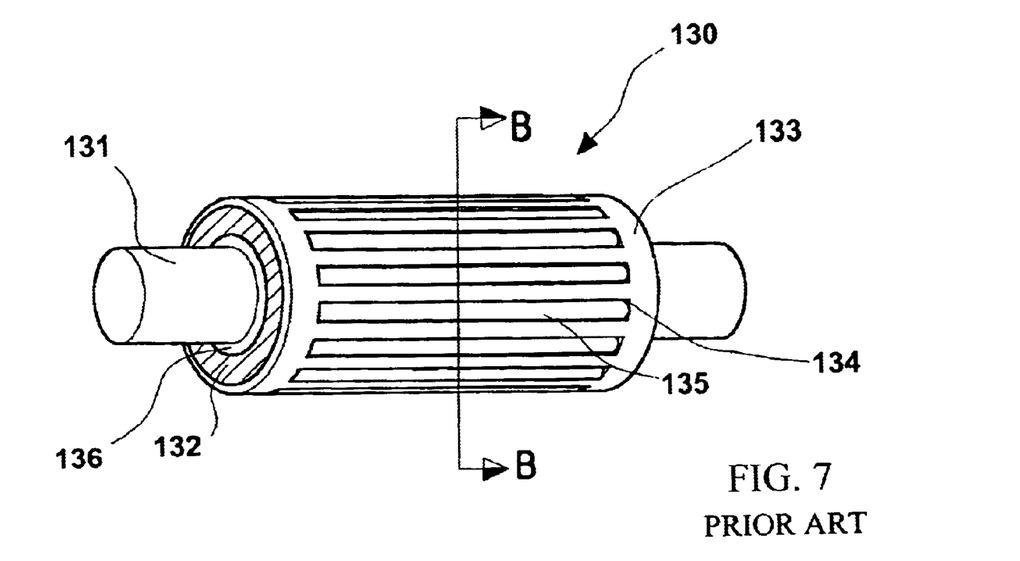
FIG. 7 is a perspective view showing the squirrel cage rotor having an inner core and a polymer resin containing powder of high magnetic permeability.
Figure 8:
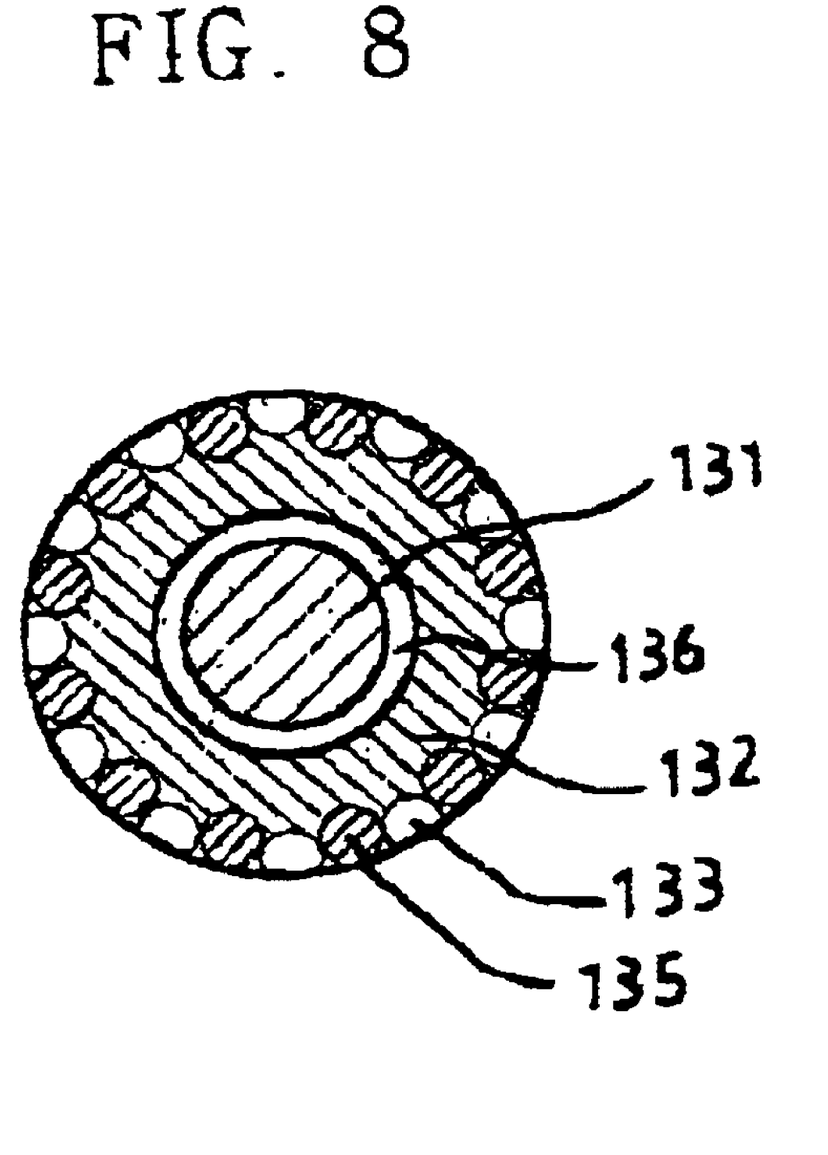
FIG. 8 a is a cross section taken along line B—B of FIG. 7.
Figure 9:
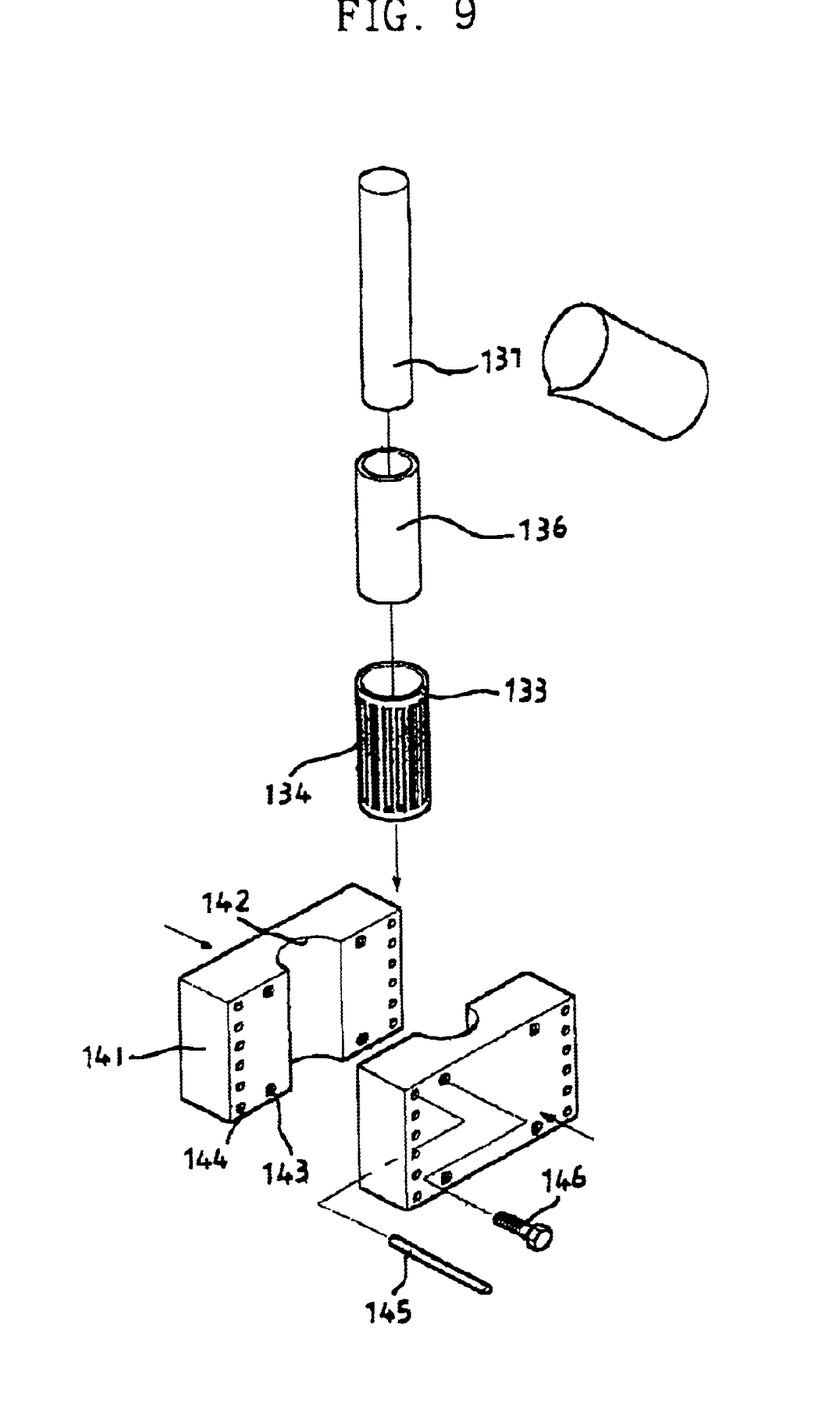
FIG. 9 is a schematic diagram explaining a method for fabricating the composite squirrel cage rotor.
Figure 10:
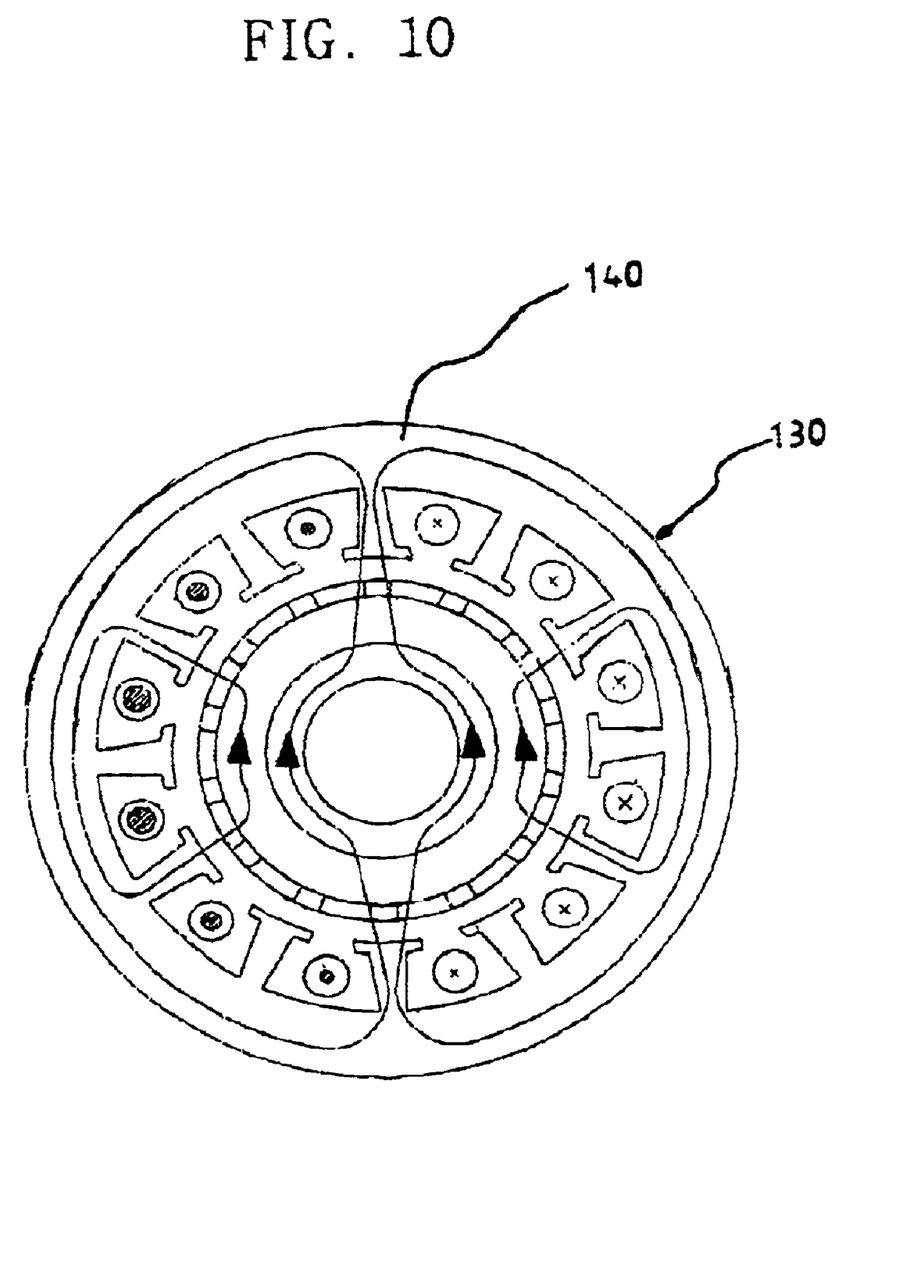
FIG. 10 is a diagram showing magnetic flux lines, which are generated while the rotor is placed in a stator.

In the drawings, FIG. 7 is a perspective view showing the composite squirrel cage rotor having an inner core and a polymer resin part containing powder of high magnetic permeability. FIG. 8 is a cross section taken along line B—B of FIG. 7. FIG. 9 is a schematic diagram explaining a method for fabricating the composite squirrel cage rotor. FIG. 10 is a diagram showing magnetic flux lines, which is generated while the rotor is placed in a stator.

As depicted in FIGS. 7 and 8, the composite squirrel cage rotor 130 of the present invention includes a rotating shaft 131. A polymer resin part 132 is filled around the rotating shaft 131 and is made of polymer resin containing powder of high magnetic permeability. A squirrel cage conductor 133 is positioned around the outer portion of the polymer resin part 132 and is provided with a plurality of axial slots 134. Plurality of heat pipes 135 are inserted into the axial slots 134, respectively.

Powder of high magnetic permeability is employed to enhance magnetic property of polymer resin part. This powder should be uniformly distributed in the polymer resin part. Chopped fibers with the length of 0.5 to 50 mm may be added to the polymer resin part so as to improve mechanical properties such as thermal stability and stiffness of the rotor structure.

The squirrel cage conductor 133 is fabricated by forming a plurality of axial slots 134 along the axis of a squirrel cage conductor by means of a machining with appropriate tools such as an end mill, an electric discharge machine tool or a laser machine tool. The axial slots 134 are spaced apart from one another by predetermined regular intervals in a circumferential direction.

The squirrel cage conductor 133 may also be fabricated with plurality of conductor bars and two end rings having holes with the same number of conductor bars by inserting the conductor bars into the holes of the end rings.

The slots 134 of the squirrel cage conductor 133 may also be made to have a predetermined angle with the axis.

As mentioned above, the heat pipes 135 are inserted into the slots 134 of the squirrel cage conductor 133 so as to dissipate heat generated during the induction operation. In this case, the heat pipes 135 are fixed in the slots 134 by polymer resin during the curing of the polymer resin part 132. The heat pipe is a sort of cooling device in which heat is transmitted from a heat source to a heat sink while circulating functional fluid, such as ammonia, methanol, Freon or the like, repeats an isothermal cycling process in vacuum sealed pipes. Heat is absorbed in the process of the phase change of the functional fluid from a liquid phase to a gaseous phase when the heat is applied to the heat pipe, gaseous functional fluid moves from a heat source side of the heat pipe to the opposite side, and heat is dissipated in the process of the phase change of the operating fluid from a gaseous phase to a liquid phase, thereby removing heat In order to increase magnetic flux density of the composite squirrel cage rotor, an inner core 136 made of material having high magnetic permeability, such as steel, may be inserted between the rotating shaft 131 and the polymer resin part 132. In this case, the inner core 136 has a role of guiding magnetic flux from the stator to the motor effectively.

Hereinafter, there is described a method for fabricating the composite squirrel cage rotor in accordance with the present invention.

As shown in FIG. 9, the inside surfaces of two steel blocks 191 are ground, and the blocks 141 are brought into contact with each other at their ground surfaces. A mold cavity 142 having a diameter slightly larger than the outer diameter of the composite squirrel cage rotor is machined by means of drilling and boring processes. In order, to align exactly the positions of the two blocks 141, guide pin holes 143 are machined through the blocks 141. The inner surface of mold cavity 142 is coated with a parting agent (not shown), such as Teflon, so as to easily remove the composite squirrel cage rotor from the mold cavity 142 after curing process.

In the slots 134 of the squirrel cage conductor 133, the heat pipes 135 are inserted respectively and this assembly is inserted into the mold cavity 142 of the blocks 141, and fastened by means of guide pins 145 and bolts 146. The rotating shaft 131 is positioned in the center of the squirrel cage conductor 133. And polymer resin containing powder of high magnetic permeability is injected into the mold cavity 142.

As a result, the cavity between the squirrel cage conductor 133 and the inner core 136 and the gaps between the slots 134 of the squirrel cage conductor 133 and the heat pipes 135 are filled with the polymer resin part. Through this process, the rotating shaft 131, the squirrel cage conductor 133 and the heat pipes 135 are combined with one another. Finally, when the blocks 141 are removed after curing of the polymer resin part, the composite squirrel cage rotor formed of polymer containing powder of high magnetic permeability is completed.

In the method for fabricating the composite squirrel cage rotor, the rotating shaft 131 and the inner core 136, need not to be assembled together with the squirrel cage conductor 133. After disposition of the heat pipes 135 into the slots 134 and inserting the squirrel cage conductor 133 into the mold cavity 142, polymer resin containing powder of high magnetic permeability is injected into the mold cavity 142 and is cured in an autoclave under predetermined curing conditions. Accordingly, the polymer resin is cured at the cavity of the squirrel cage conductor 133 and the gaps between the slots 134 and the heat pipes 135.

When the polymer resin part is cured, the center portion of the filled squirrel cage conductor 133 is bored for assembly of inner core 136 using a drill. The inner core 136 is inserted into the bored center portion in the center of the composite squirrel cage rotor. The rotating shaft, 131 is inserted into the inner core 136. Through these processes, the composite squirrel cage rotor having a polymer resin part containing powder of high magnetic permeability is completed.

When the composite squirrel cage rotor fabricated as described above is placed in the stator 140, a magnetic field is generated as shown in FIG. 10.

Figure 11:
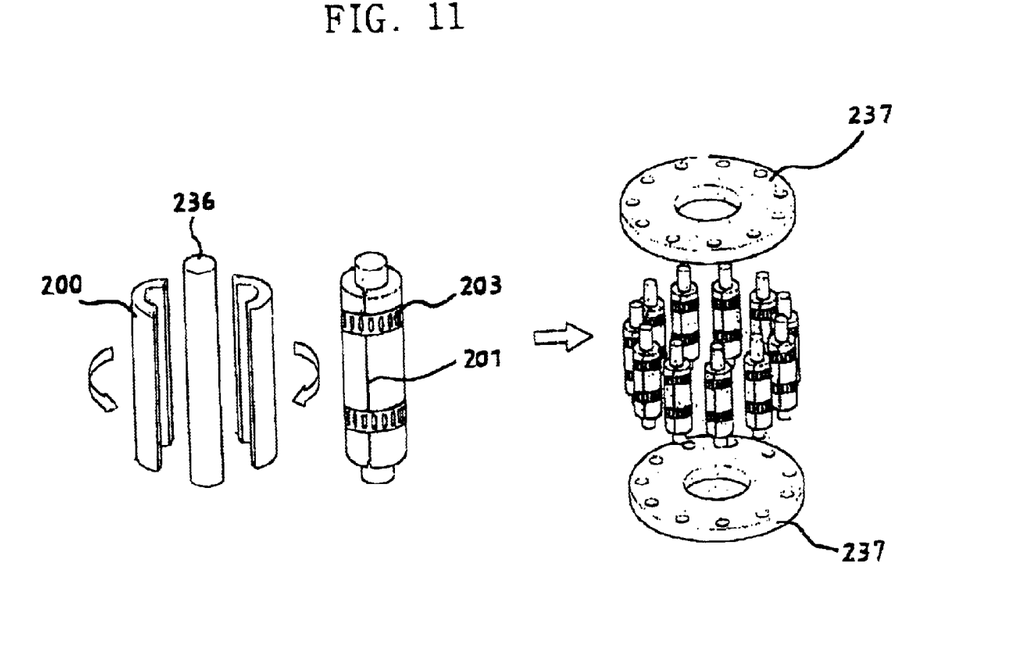
FIG. 11 is a perspective view showing the process of the assembly of conductor bars and end rings.
Figure 12:
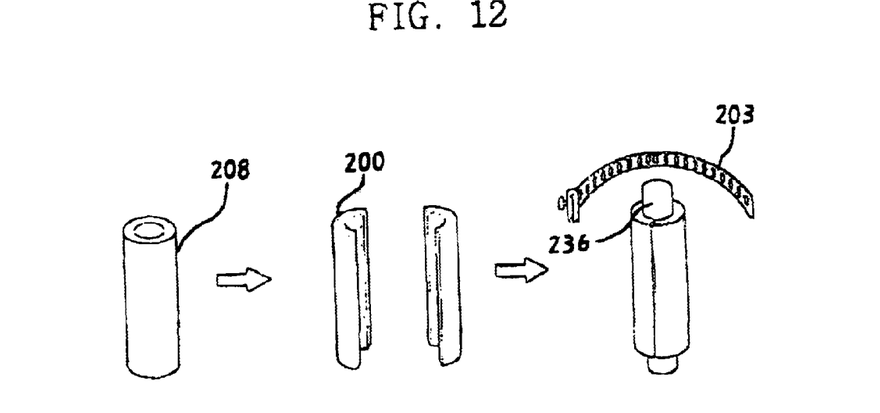
FIG. 12 is a perspective view showing the procedure of the assembly of jig and conductor bars.

In the drawings, FIG. 11 is a perspective view showing the assembly of conductor bars and end rings. FIG. 12 is a perspective view showing the procedure of the assembly of jig and conductor bars.

As shown in FIGS. 11 and 12, each of the conductor bar 236 is surrounded by a pair of jig 200. The conductor bars 236 are made of material having high electric conductivity such as copper or aluminum, whereas the jig 200 are made of material having high stiffness such as steel.

Each pair of the jig 200 can be fabricated by axially dividing a hollow cylinder 208 into two equal parts. Each pair of jig 200 fabricated as described above surrounds each of the conductor bars 236. The inner diameter, which is defined by each pair of jig 200 while each of jig 200 is brought into contact with each other to form a: hollow cylinder, is smaller than the outer diameter of the conductor bars 236, so that a gap 201 is formed between each pair of jig 200 while each pair of jig 200 surrounds each conductor bar 236.

Each pair of 200 is clamped together by a band camp 203 while enclosing each conductor bar 236. Both ends of each conductor bar 236 are tapered, and the tapered ends of each conductor bar 236 are respectively inserted into the holes formed in two end rings 237. Both ends of the conductor bars 236 are inserted into the holes in the end rings 237 with interference fit. At this time, since each conductor bar 236 is respectively surrounded by each pair of jig 200, the conductor bars 236 are not buckled. After the conductor bars 236 and the end rings 237 are completely assembled together, the band clamps 203 and the jig 200 are removed. As a result, the fabrication of the squirrel cage conductor in which two end rings 237 are assembled by conductor bars 237 is completed.

The obtained squirrel cage conductor is inserted into the mold cavity (not shown in FIGS. 11 and 12). In this state, polymer resin (not shown in FIGS. 11 and 12) containing powder of high magnetic permeability is injected into and cured between the cavity of the squirrel cage conductor and the mold cavity.

After the polymer resin part containing powder of high magnetic permeability is cured, the blocks 141 are removed. The squirrel cage conductor combined with the polymer resin part is ground at its outer surface, so that the some portion of the conductor bars 236 are axially exposed on the outer surface of the composite squirrel cage rotor. Thus this composite squirrel cage rotor is completed.

As described above, the present invention provides a composite squirrel cage rotor, which has a polymer resin part containing powder of high magnetic permeability so that the rotor has low mass in comparison with conventional squirrel cage rotors.

Additionally, the present invention provides a composite squirrel cage rotor in which powder of high magnetic permeability is uniformly distributed in the polymer resin part, so that magnetic property is enhanced, thereby improving the performance of the motor.

Additionally, the present invention provides a lightweight squirrel cage rotor, which does not require great driving torque arid which can improve the quality of products thanks to reduction of vibration, stress and inertial force.

Additionally, the present invention provides a squirrel cage rotor, which is provided with heat pipes in order to effectively dissipate heat generated by induction operation therefore this composite squirrel cage rotor has good thermal stability.

Additionally, the present invention provides a method for fabricating the squirrel cage conductor, which can prevent conductor bars from being buckled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite squirrel cage rotor, comprising:
    a rotating shaft;
    a polymer resin body containing chopped fibers and powder of high magnetic permeability, said powder being uniformly distributed in the polymer resin body;
    a plurality of squirrel cage conductor bars positioned axially around and embedded in said polymer resin body, said conductor bars being formed of material having high electric conductivity;
    a plurality of axial slots, wherein said axial slots are formed between said cage squirrel conductor bars;
    heat pipes inserted into the axial slots for dissipating heat generated in the composite squirrel cage rotor, said heat pipes being sealed and containing isothermal cycling materials therein; and
    an inner core having high magnetic permeability, said inner core being disposed between said shaft and said polymer resin body for increasing the magnetic flux density of the composite squirrel cage rotor.

2. The rotor according to claim 1, wherein said chopped fibers are from approximately 0.5 millimeters to approximately 50 millimeters in length.

3. The rotor according to claim 1, wherein said isothermal cycling materials are an ammonia, methanol and Freon.

* * * * *